Oct. 17, 1933.  I. KITROSER  1,931,228
OPTICAL APPARATUS FOR THE EXAMINATION OF GOFFERED FILMS
Filed Oct. 13, 1930
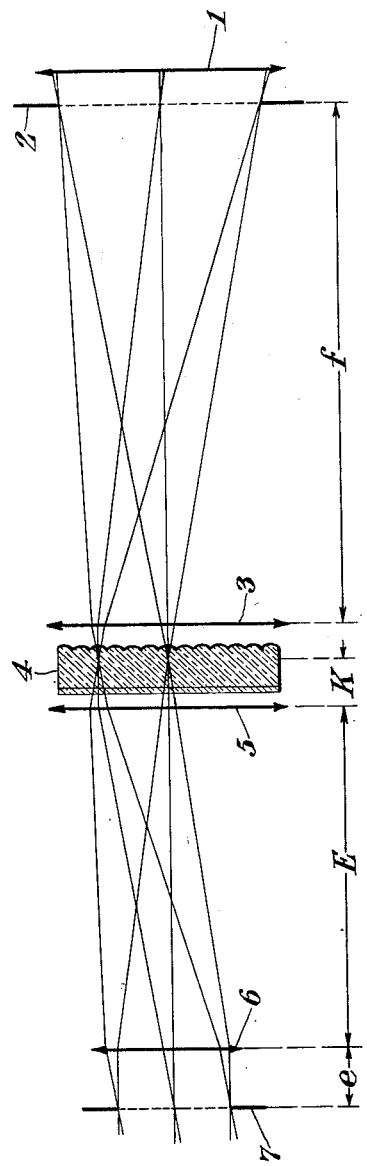
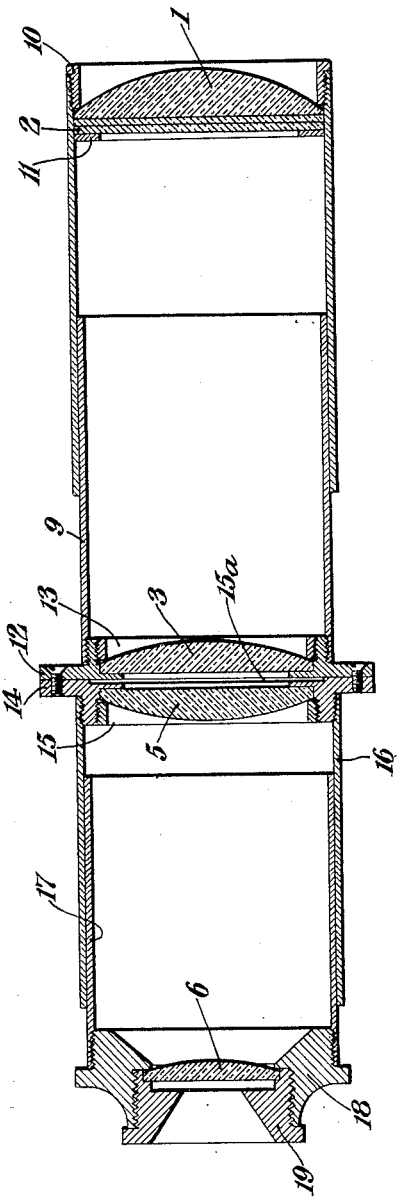
INVENTOR
Isaac Kitroser
BY
Arthur Wright
ATTORNEY

UNITED STATES PATENT OFFICE

1,931,228

OPTICAL APPARATUS FOR THE EXAMINATION OF GOFFERED FILMS

Isaac Kitroser, Paris, France, assignor to Keller-Dorian Colorfilm Corporation, New York, N. Y., a corporation of Delaware Application October 13, 1930. Serial No. 488,306

7 Claims. (Cl. 88—39)

My invention relates especially to a special optical magnifying glass for the examination of goffered colored films.

The object of the present invention is to provide special magnifying glasses enabling goffered films to be examined more effectively.

While my invention is capable of embodiment in many different forms, the annexed drawing illustrates the optical system made according to my invention, in which Figure 1 shows diagrammatically the path of the luminous rays enabling one to see the cinematographic picture in its proper size and its natural colors with the aid of the color filter, and Figure 2 shows the mounting of the lenses, in the example where a collimating lens is used.

Referring to the drawing, I have shown a planoconvex lens 1, which has a flat side with a ground glass finish and a very much bulged convex side in order to make this lens a perfect luminous diffuser. This lens which is in contact with the three-color light filter 2, for example a filter having 3 bands colored blue, green and red respectively, illuminates it uniformly.

The three-color filter 2 is exactly in the focal plane of a collimatric lens 3 which directs the light in parallel rays on to the film to be viewed.

The ratio of the diameter of the light filter 2 to the focal length of the lens 3 is the same as the aperture of the camera photographic objective, that is to say in the camera used in taking the pictures on the film, the size of the pupil of emergence or apparent size of the diaphragm seen from the focal plane of the camera lens divided by the focal length of the lens.

On the other hand, the width of the central strip, for example the green strip, of the three-color filter 2 should be 0,264 times the diameter of the opening in the filter, in order that the green surface may be equal to the adjoining spaces which are red or blue. Consequently, there will be no color having more light receiving area than another and the same rule must be adopted for the light filter of the camera objective.

A goffered film 4 carrying the picture is arranged to slide between the lens 3 and a lens 5, the goffered face being turned towards the filter 2. The cylindrical lenses of the lenticulated surface of the goffered film are arranged parallel to the strips of color in the filter.

The lens 5 which can be called a field lens has for its object to form the image of the filter 2 on the pupil of the observer's eye 7. Finally, a lens 6 is provided as a magnifying glass of convenient magnifying power.

Several means of adjustment should be provided for, however.

First, the regulation of the magnifying glass 6 for different observers, that is to say normalsighted, short-sighted and far-sighted.

Secondly, the light filter 2 must be able to be set correctly in reference to the cylindrical lenses of the goffering.

Thirdly, the same light filter 2 must be able to move forwardly or backwardly with regard to focal-plane of the lens 3 in order to rectify the displacement of the magnifying glass 6.

The following are some mathematical formulæ which may be used in order to determine the optical characteristics of the present apparatus.

$f$ is the focus of the lens 3, that is to say the distance between said lens and the three-color filter 2.

The magnifying power of the $$\text{apparatus} = \frac{250}{F} mm.,$$

where, F=focus of the lenses 6 and 5.

$$\frac{1}{F} = \frac{1}{f_1} + \frac{1}{f_2} - \frac{E}{f_1 f_2},$$

where, $f_1$=focus of lens 6,
$f_2$=focus of lens 5, and
$E$=distance between the lens 6 and lens 5.

In the case where the film has been taken with a collimatric lens, $$\frac{1}{e} = \frac{1}{f_2 - E} + \frac{1}{f_1}$$

where, $e$=distance between the pupil of the eye and the lens 6.

For instance, Figures 1 and 2 show a magnifying glass of magnifying power 4, and $$\frac{1}{K} = \frac{1}{f_1 - E} + \frac{1}{f_2}$$

where K is the distance between the lens 5 and the film 4.

The magnifying power of the apparatus is therefore $$4 = \frac{250}{F}$$

As an example, the characteristics of a set of lenses which may be used in my apparatus would accordingly be as follows:

$F$=62.5 mm.  $E$=62 mm.
$f_1$=65 mm.  $e$=10.8 mm.
$f_2$=75 mm.  $K$= 2.89 mm.

If the film has not been taken with a collimating lens, the lens 3 would not be used at all or would not be a collimating lens, but if used, must have such a focus that the filter as seen through it, or the virtual image, should appear to be at the same distance from the film as the color filter virtual image, appears to be from the film in the camera objective; and the lens 5 must be chosen so as to form the image of the filter 2 on the observer's pupil. For such a lens 5, $$\frac{1}{a} = \frac{-1}{f} + \frac{1}{f'_1}$$

where, $f'_1$=focus of lens 3, $f$ is the distance between the lens 3 and the color filter 2, and $a$=distance of the color filter to the film in camera objective.

$$\frac{1}{F} = \frac{1}{f_1} + \frac{1}{f_2} - \frac{E}{f_1 f_2}$$

$$\frac{1}{K} = \frac{1}{f_1 - E} + \frac{1}{f_2}$$

$$\frac{1}{e} = \frac{a - f_2}{f_2 a - Ea + E f_2} + \frac{1}{f_1}$$

For example, lenses used in my apparatus for viewing a film not taken with a collimated lens, could have the following characteristics:

| | | | | |
|---|---|---|---|---|
| $F=$ | 62.5 mm. | | $f_2=$ | 35 mm. |
| $f=$ | 75 mm. | | $E=$ | 65.8 mm. |
| $a=$ | 50 mm. | | $K=$ | 3.75 mm. |
| $f'_1=$ | −150 mm. | | $e=$ | 14.57 mm. |
| $f_1=$ | 70 mm. | | | |

As shown in Fig. 2, the lenses, as above referred to, may be mounted as follows: The diffuser 1 and color filter 2 in the form of two glass plates with 3 color bands between them may be mounted in the end of an outer sleeve 8 arranged to slide back and forth on one end of a tube 9. A screw-threaded ring 10 and a friction-retained diaphragm 11, hold the diffuser 1 and the color filter 2 in place. In the other end of the tube 9 there is screw-threaded a flanged ring 12 for receiving the collimating lens 3, an inner screw-threaded ring 13 being provided as a retainer for said lens. To the flanged ring 12 there is screwed a similar flanged ring 14, provided for holding the lens 5, a retainer ring 15 being located therein adjacent to the said lens 5. The rings 12 and 14 have a slot 15ᵃ between them for receiving the film 4 to be viewed. A sleeve 16 is screw-threaded to the ring 14, and within the sleeve 16 there is a tube 17, arranged to be moved back and forth, to the forward end of which there is screw-threaded a flanged ring 18, to which there is screw-threaded in turn an eye-piece 19 for retaining in place the lens 6.

In use, the film 4 is inserted in the slot 15ᵃ, with the goffering facing the color filter 2 with the pictures upright, and the sleeve 8 is turned until the color bands of the filter 2 are in the opposite position to those of the color filter in the camera lens used where an original film is being viewed in the apparatus, and with the color bands of the filter 2 in the same position as those in the camera color filter where a copy of the original film is being viewed. The sleeve 8 is then moved back and forth until the color filter 2 is seen with the eye, and then the tube 17 is moved back and forth until the pictures appear sharp to the eye, when the pictures will appear in the original colors of the objects viewed therein.

While I have described my invention above in detail, it is to be understood that many changes may be made therein without departing from the spirit thereof.

I claim:

1. A magnifying glass for examining a goffered film, comprising an optical means, including a color filter, adapted to apply color areas of light to the goffered film, corresponding to the color areas through which the picture was taken thereon, including a light diffuser and a collimating lens, the filter being located in the focal plane of the collimating lens, and a magnifying device adapted for viewing the film with the aid of the color areas applied thereto.

2. A magnifying glass for examining a goffered film, comprising an optical means, including a color filter, adapted to apply color areas of light to the goffered film, corresponding to the color areas through which the picture was taken thereon, including a light diffuser and a collimating lens, the filter being located in the focal plane of the collimating lens, and a magnifying device adapted for viewing the film with the aid of the color areas applied thereto comprising a field lens adapted to form an image of the color filter on the pupil of the eye.

3. A magnifying glass for examining a goffered film, comprising an optical means, including a color filter, adapted to apply color areas of light to the goffered film, corresponding to the color areas through which the picture was taken thereon, including a light diffuser and a collimating lens, the filter being located in the focal plane of the collimating lens, and a magnifying device adapted for viewing the film with the aid of the color areas applied thereto comprising a field lens adapted to form an image of the color filter on the pupil of the eye; and a magnifying lens adapted for enabling the image to be seen near to the observer.

4. A magnifying glass for examining a goffered film, comprising an optical means, including a color filter, adapted to apply color areas of light to the goffered film, corresponding to the color areas through which the picture was taken thereon, including a light diffuser and a collimating lens, the filter being located in the focal plane of the collimating lens, and a magnifying device adapted for viewing the film with the aid of the color areas applied thereto comprising a field lens adapted to form an image of the color filter on the pupil of the eye; and a magnifying lens adapted for enabling the image to be seen near to the observer, the color filter and magnifying lens being so mounted as to be capable of adjustment to and from the film respectively.

5. A magnifying glass for examining a goffered film, comprising an optical means, including a color filter, adapted to apply color areas of light to the goffered film, corresponding to the color areas through which the picture was taken thereon, including a light diffuser and a collimating lens, the filter being located in the focal plane of the collimating lens, and a magnifying device adapted for viewing the film with the aid of the color areas applied thereto, the ratio of the diameter of the color filter to the focal length of the collimating lens being the same as the aperture of the camera with which the film picture was made.

6. A magnifying glass for examining a goffered film, comprising an optical means, including a color filter and a lens, adapted to apply color areas of light to the goffered film, corresponding to the color areas through which the picture was taken thereon, and a magnifying device adapted for viewing the film with the aid of the color areas applied thereto, the first-mentioned lens being such that when the picture has not been taken with a collimating lens, the film is located the same distance from the virtual image of the color filter seen therethrough as the film was from the virtual image of the color filter seen through the camera lens.

7. A magnifying glass for examining a goffered film, comprising an optical means, including a color filter, adapted to apply color areas of light to the goffered film, corresponding to the color areas through which the picture was taken thereon, and a magnifying device adapted for viewing the film with the aid of the color areas applied thereto, the color filter being located the same distance from the film, when the latter was not taken with a collimating lens, as the film was from the virtual image of the color filter in the camera lens.

ISAAC KITROSER.